(12) United States Patent
Damien et al.

(10) Patent No.: US 7,987,299 B2
(45) Date of Patent: Jul. 26, 2011

(54) DATA PROCESSING APPARATUS AND METHOD THEREOF

(75) Inventors: Le Moal Damien, Sagamihara (JP); Mika Mizutani, Tokyo (JP); Yoshiaki Morimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1654 days.

(21) Appl. No.: 10/873,176

(22) Filed: Jun. 23, 2004

(65) Prior Publication Data
US 2005/0223381 A1    Oct. 6, 2005

(30) Foreign Application Priority Data

Apr. 2, 2004  (JP) ................................ 2004-109599

(51) Int. Cl.
G06F 3/00   (2006.01)
G06F 9/46   (2006.01)
(52) U.S. Cl. .......................... 710/20; 718/102
(58) Field of Classification Search .................... 710/20; 718/102
See application file for complete search history.

(56) References Cited

U.S. PATENT DOCUMENTS

| 5,487,167 A | 1/1996 | Dinallo et al. |
| 5,668,601 A * | 9/1997 | Okada et al. ............. 375/240.25 |
| 6,714,986 B2 * | 3/2004 | Karibe et al. ................ 709/240 |
| 6,977,877 B2 * | 12/2005 | Mori ......................... 369/47.24 |
| 7,228,347 B2 | 6/2007 | Yoshio |
| 2002/0038451 A1 | 3/2002 | Tanner et al. |
| 2002/0099732 A1 | 7/2002 | Miller et al. |
| 2005/0240297 A1 * | 10/2005 | Scotzin et al. .................. 700/94 |

FOREIGN PATENT DOCUMENTS

| JP | 5-265781 | 10/1993 |
| JP | 10-283195 | 10/1998 |
| JP | 2002-335426 | 11/2002 |
| JP | 2003-303102 | 10/2003 |

OTHER PUBLICATIONS

Stankovis J.A. et al., "The Spring Kernel: A New Paradigm for Real-Time Operating Systems", Operating Systems Review, ACM, New York, NY, US, vol. 23, No. 3, pp. 54-71, Jul. 1, 1989.

* cited by examiner

Primary Examiner — Henry W Tsai
Assistant Examiner — Juanito C Borromeo
(74) Attorney, Agent, or Firm — Antonelli, Terry, Stout & Kraus, LLP.

(57) ABSTRACT

A method of configuring and performing stream data processing linked to a series of process points for high portability uses a link module to connect process points, called peer modules, to configure a stream data path. A single execution context is used for scheduling to enable high-performance processing. These constituent features are provided in a layer configuration to realize high portability and ease of development.

15 Claims, 15 Drawing Sheets

FIG.5

| | Instruction type | Parameter | Return value |
|---|---|---|---|
| 500 | Stream process generation | None | Stream process ID |
| 510 | Stream process discard | Stream process ID | Successful or unsuccessful flag |
| 520 | Peer module generation | Stream process ID | Peer module ID |
| 530 | Peer module discard | Stream process ID, peer module ID | Successful or unsuccessful flag |
| 540 | Link module generation | Stream process ID, source peer module ID, destination peer module ID | Link module ID |
| 550 | Link module discard | Stream process ID, link module ID | Successful or unsuccessful flag |
| 560 | Data processing module control | Stream process ID, peer module ID, data processing module ID, command, parameter | Successful or unsuccessful flag |
| 570 | Data access module control | Stream process ID, peer module ID, data access module ID | Successful or unsuccessful flag |
| 580 | Data processing control command | Stream process ID, command (start/stop) | Successful or unsuccessful flag |
| 590 | Event management | Stream process ID, peer module ID, event information | Successful or unsuccessful flag |

Columns: 501, 502, 503

| Scheduled time (milliseconds) | Peer module ID |
|---|---|
| 250 | 10 |
| 250 | 13 |
| 300 | 12 |
| 500 | 11 |

| Data access module ID | Input/output execution section address | Function | Input/output completion section address | Function |
|---|---|---|---|---|
| 1 | 0xf9800000 | Issues a request to read data onto the hard disk. | 0xf9808000 | Obtains data from the hard disk. |
| 2 | 0xf9810000 | Sends data to the video decoder. | 0xf9818000 | Collects buffers where the reproduction is complete. |
| 3 | 0xf9820000 | Sends data to the audio decoder. | 0xf9828000 | Collects buffers where the reproduction is complete. |
| ... | | ... | | ... |

| Data processing module ID (1501) | Preprocessing section address (1502) | Function (1504) | Postprocessing section address (1503) | Function (1505) |
|---|---|---|---|---|
| 100 | 0xfa800000 | Instructs to read a specified file. Specifies the next scheduling time. | 0xfa808000 | Outputs obtained data to the output link. |
| 120 | 0xfa810000 | Obtains data from the input link and divides the data. Specifies the next scheduling time. | 0xfa818000 | Outputs divided data to two output links. |
| 150 | 0xfa820000 | Obtains data from the input link and requests reproduction of video in the data. Specifies the next scheduling time. | 0xfa828000 | Discard used buffer. |
| 160 | 0xfa830000 | Obtains data from the input link and requests reproduction of audio in the data. Specifies the next scheduling time. | 0xfa838000 | Discard used buffer. |

(1500, rows 1510, 1520, 1530, 1540)

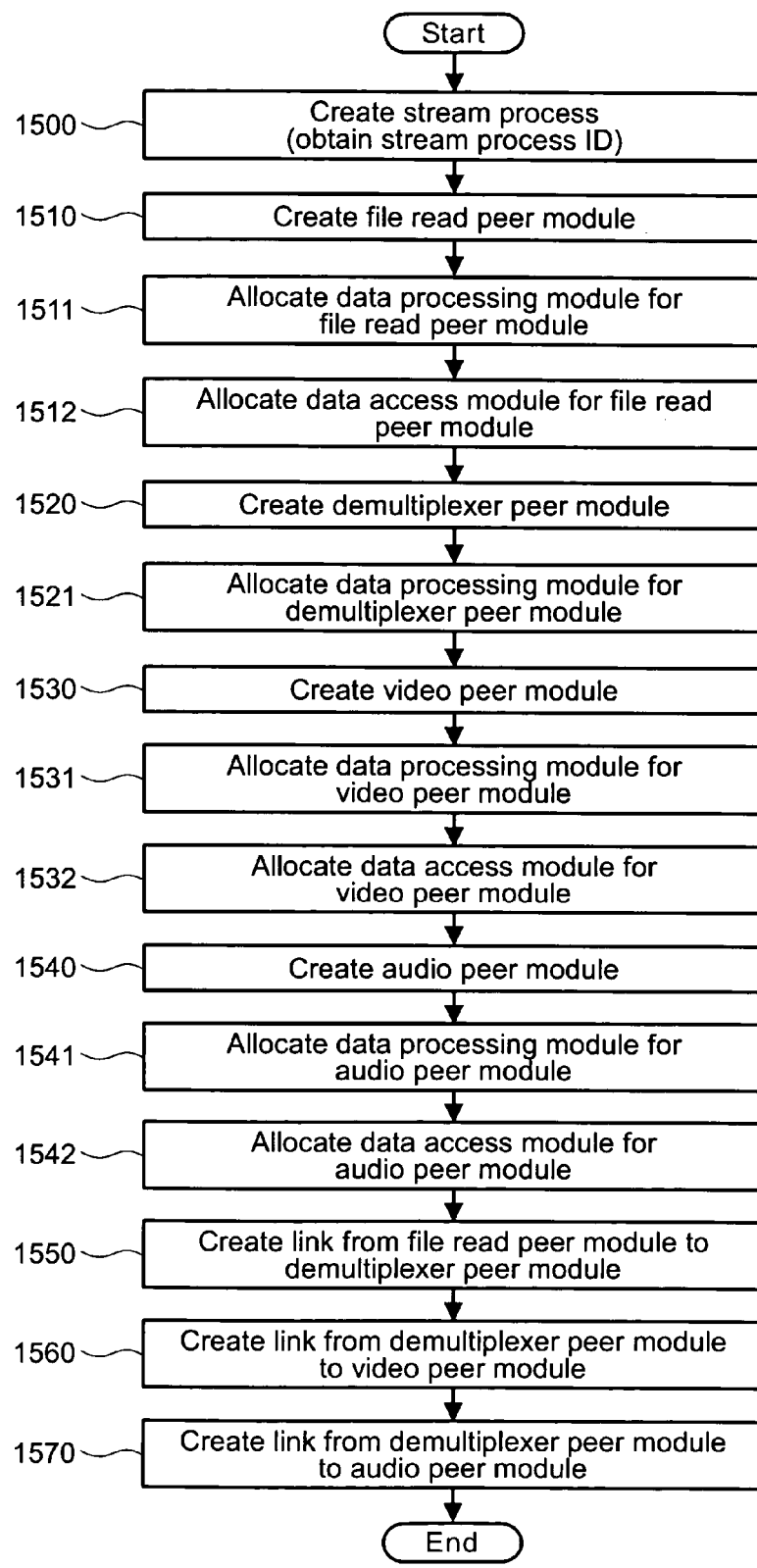

FIG.16

| Peer module ID | Stream process ID | Data processing module ID | Data access module ID | Input link module ID | Output link module ID | Execution waiting data object matrix | Postprocessing waiting data object matrix |
|---|---|---|---|---|---|---|---|
| 100 | 1 | 100 | 1 | -1 | 110 | ○ | ○ |
| 120 | 1 | 200 | -1 | 110 | 130,140 | ○ | |
| 150 | 1 | 300 | 2 | 130 | -1 | ○ | |
| 160 | 1 | 400 | 3 | 140 | -1 | | ○ |

| Link module ID | Stream process ID | Start point peer module ID | End point peer module ID | Buffer matrix |
|---|---|---|---|---|
| 110 | 1 | 100 | 120 | □ |
| 130 | 1 | 120 | 150 | □ |
| 140 | 1 | 120 | 160 | □ |

1901 1902 1903 1904 1905
1910 1920 1930
1900

DATA PROCESSING APPARATUS AND METHOD THEREOF

BACKGROUND OF THE INVENTION

The present invention relates to a method of processing data independently of a specific operating system (OS).

In recent years, computers have been available which handle moving images and audio data that are variously used as multimedia data. Devices to record and reproduce such data are also experiencing widespread use. For example, a hard disk recorder has been developed to convert television moving images and the like in real time using a moving image codec and to record the moving images on a hard disk. An audiovisual player uses a video display apparatus to display moving image content data recorded as digital data on an optical disk, such as a DVD. In general, the content processing requires the processing of content data at a specified bit rate within a specified time.

A variety of apparatuses need to use multimedia contents. For this purpose, it is important to be able to easily develop program modules that perform complicated streaming processes. To do this, there are technologies for performing programs to process data contents in the OS kernel that can easily provide high performance. A stream is a series of data that needs to be processed unidirectionally in a predetermined order. For example, there is available a series of audio data or moving image data. The streaming process signifies processing data included in these streams.

A general OS uses two spaces: a user space to perform applications and a kernel space to perform OS functions. The kernel space enables high-speed execution of processes. Basically, however, programs to be performed in the kernel largely depend on specifications of the OS where the kernel is installed. For example, individual OS's require different interfaces or procedures to use the OS functions. It is also a known fact that device drivers needed to use devices are specific to the platforms and cannot be shared among them. Further, there are methods of performing processes in the kernel space. One example is to process the contents by concatenating a plurality of device drivers called filters to process data (e.g., JP-A No. 283195/1998).

This method processes data contents as follows. An application program performed in the user space generates a software module called a filter in the kernel space. Inputs and outputs for a plurality of filters are connected to constitute a path for content data. Then, the application program makes a request to start or stop processes. In this case, the filters and device drivers are modules specific to the devices and data formats and each have respective input/output and control interfaces. One filter processes data and passes it to another filter to perform the data processing. According to this technique, all filters operate in the OS kernel, making it possible to provide a high performance. However, this technique gives no consideration to priorities in a plurality of content processes. When a plurality of contents are to be recorded and reproduced simultaneously, there may be a request to give preference to the recording. It is difficult to satisfy such request.

As mentioned above, it is known to sometimes implement drivers to process streams in the OS kernel space because the drivers can easily ensure the desired performance. The drivers are highly dependent on a platform, i.e., a combination of the OS and the hardware configuration. Programs cannot be compliant with different platforms. Each platform has a specific method of processing content data. Programs to process contents need to be developed for individual platforms. There has been a first problem of increasing development processes.

The technique employed in JP-A No. 283195/1998 does not provide a management function for content processes. When a plurality of contents need to be processed simultaneously, it has been impossible to prioritize each process. For example, let us consider a case of simultaneously performing two processes: one process to obtain data from a device and record the data on a storage and the other process to obtain data from the device and display the data on a display. If the former process needs to be prioritized, a function to unify and manage these processes is not provided. There has been a second problem of difficulty in appropriately changing the priorities of the processes.

If content processes take place based on a specific implementation in is the above-mentioned case, hardware resources are not managed or allocated properly. There has been a third problem of decreasing the CPU resource needed for the processes.

SUMMARY OF THE INVENTION

It is therefore an object of the present invention to solve at least one of the above-mentioned problems.

To solve the first problem, the present invention provides multimedia content processing capable of complying with various platforms. The present invention provides a layer for processing multimedia contents so that the layer can supply higher-order software modules with a generalized interface to resolve differences between platforms. In this manner, the present invention realizes a construction that allows the higher-order software modules to be independent of the platforms.

In order to solve the above-mentioned second or third problem, the present invention performs a plurality of streaming processes using one execution context, such as a process or a thread. The present invention provides a unified way of managing how much resource should be allocated to each of the content processes to prioritize the processes and manage the resource.

The present invention allows a program using content data to be used for different platforms. The present invention makes it possible to manage execution of a plurality of content processes so as to be able to decrease the amount of resources to be used.

BRIEF DESCRIPTION OF THE DRAWINGS

FIG. 5 is a table which shows a control interface according to the embodiment;

FIG. 13 shows a table for managing correspondence between a data access module ID and an address for data access module management information;

FIG. 14 shows a table for managing correspondence between a data processing module ID and an address for data processing module management information;

FIG. 15 is a flow diagram showing a procedure to constitute a streaming process;

FIG. 16 is a table which shows the configuration of a peer module;

FIG. 17 is a table which shows the configuration of a link module; and

DESCRIPTION OF THE PREFERRED EMBODIMENTS

Embodiments of the present invention will be described in further detail.

Embodiment 1

Figure 1:
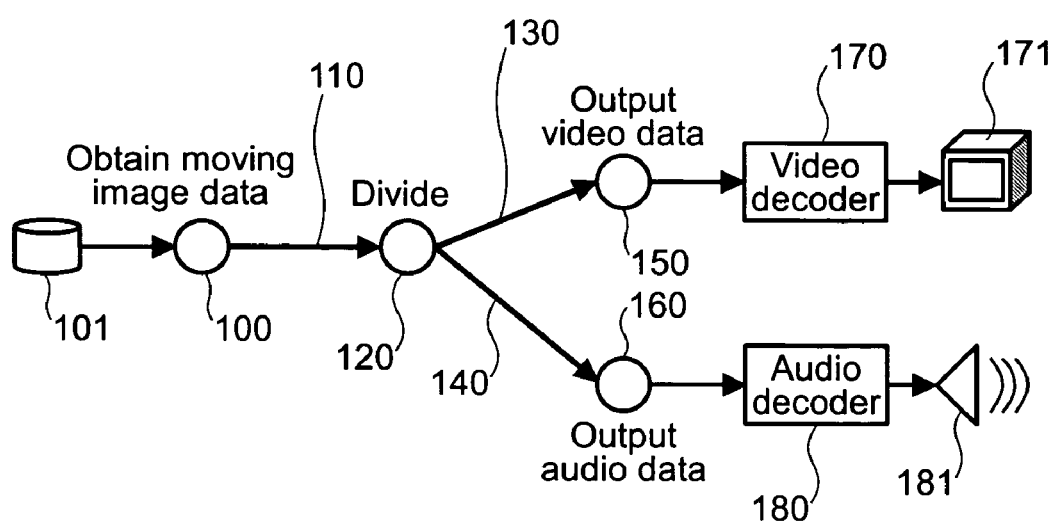
FIG. 1 is a schematic block diagram showing a data processing flow configured as a data flow between process points.

With reference to FIG. 1, the following description provides an overview of the process flow according to the present invention. The process flow involves the acquisition of moving image data as a moving image content from a disk (101) and the reproducing of the data on a display (171) and from a speaker (181). These processes comprise a process point (100) to acquire data from a device (101), a process point (120) to divide the acquired data into audio data and video data, a process point (150) to output video data to a video decoder (170), and a process point (160) to output audio data to an audio decoder (180). The process point is a portion needed to perform a specified process in the program that implements the process flow. At the process point, a software module performs the process. This software module is referred to as a peer module. The detailed configuration of a peer module will be discussed below with reference to FIG. 16. Further, a link module connects peer modules to each other. For example, a link module (110) connects the peer module (100) to the peer module (120). The link module provides a function of transmitting data from one peer module to another peer module. When the peer module (100) acquires data, the data is sent to the video decoder (170) and the audio decoder (180) via the link modules and the other peer modules. In this manner, video data is displayed on the display (171) and audio data is reproduced from the speaker (181).

Figure 2:
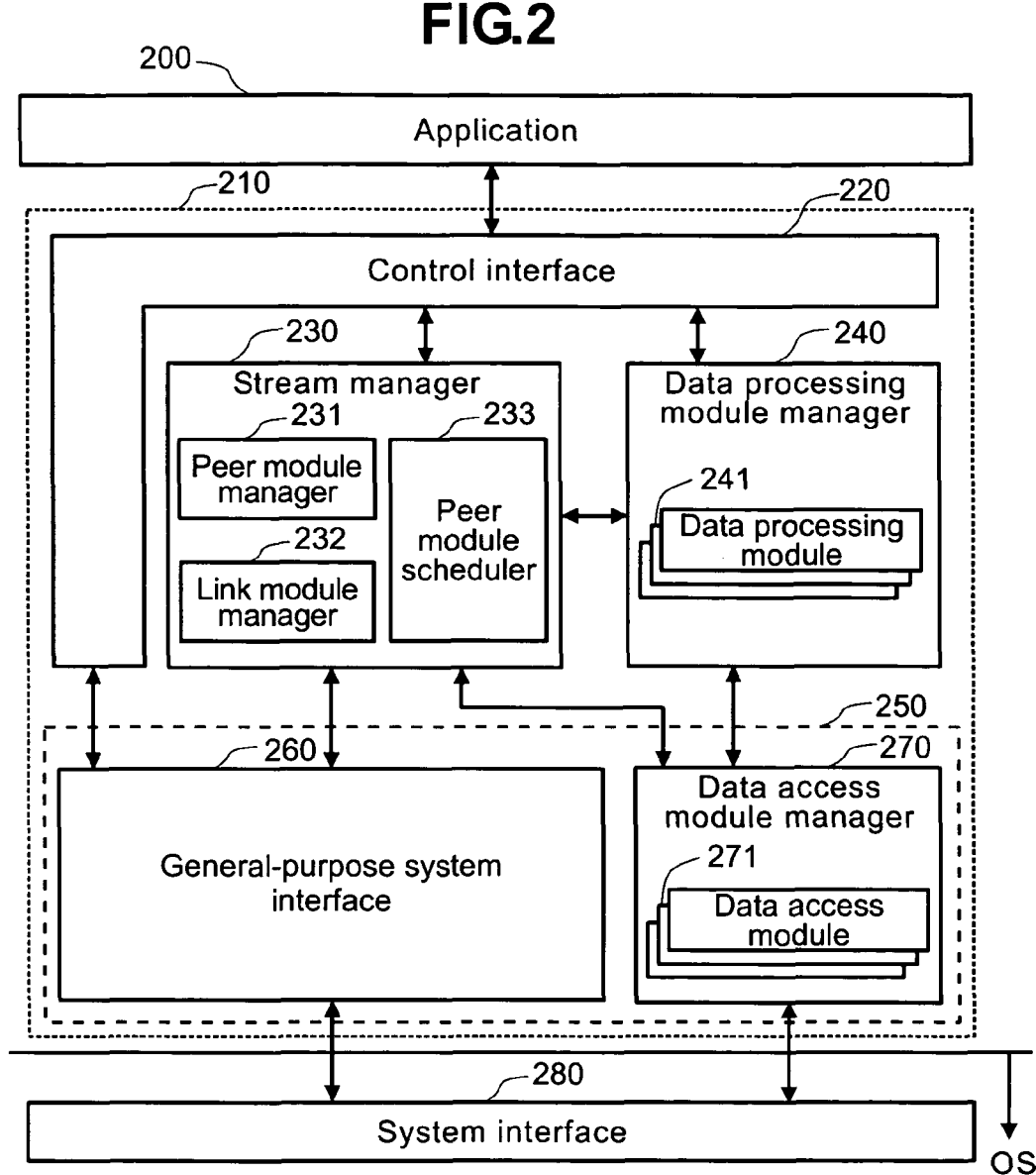
FIG. 2 is a schematic block diagram showing the overall configuration of elements according to the embodiment.

FIG. 2 shows an example of the software configuration according to this embodiment. A configuration (210) comprises a stream manager (230) and a data processing module manager (240). The stream manager (230) controls a streaming process that links peer modules to each other. The data processing module manager (240) manages a data processing module (241) that converts data and the like. The stream manger comprises a peer module manager (231), a peer module scheduler (233), and a link module manager (232). The peer module manager (231) manages and operates peer modules. The peer module scheduler (233) is used to perform peer module processes according to an execution schedule. The link module manager (232) records and manages the link modules for connecting the peer modules to each other.

The OS provides a system interface (280) to use OS functions. Via the system interface (280), a general-purpose system interface (260) is provided to use resource management functions, such as memory management, thread management, and time operation. There is also a data access module manager (270) to manage a data access module (271) that accesses devices, acquires data, and controls devices.

An application (200) uses a control interface (220) to control the stream manager and the data processing module manager. The application can specify an intended streaming process. Specifiable controls will be described later with reference to FIG. 5.

There is an interface layer (250) including the general-purpose system interface (260) and the data access module manager (270). The interface layer uses a generalized interface to provide higher layers with functions provided from the OS-provided system interface (280). The generalized interface resolves differences among protocols and instruction systems resulting from platform differences and provides standardized functions for higher layers. An example of such an interface is a socket interface to be used for network communication. The interface performs the same functions independently of different platforms. The respective platforms use different procedures to use the functions. To create a socket to be communicated in TCP, for example, general Unix (registered trademark) systems including Linux just need to perform the socket, bind, listen, and accept functions in order. On the other hand, Windows (registered trademark) systems require procedures different from Linux in compliance with the other specifications. If the application program is responsible for settling these differences as conventionally practiced, it is necessary to change all processes that vary with the platforms to be used. To solve this problem, for example, the generalized interface provides a generic function, such as makeServerTCPsock, so as to create a server socket at a specified port. For example, the general-purpose system interface for Linux allows the makeServerTCPsock function to perform processes according to the above-mentioned Linux procedure. On the other hand, the general-purpose system interface for Windows allows the makeServerTCPsock function to perform processes according to the Windows procedure. When a software module according to the present invention is to be used under Linux, the general-purpose system interface for Linux is used. When a software module according to the present invention is to be used under Windows, the general-purpose system interface for Windows is used. To create a socket, the application program calls makeServerTCPsock. The corresponding general-purpose system interface performs the procedure associated with the platform. This eliminates the need for changing the application program depending on platforms. In this manner, it becomes possible to generalize methods of accessing functions and devices provided by the platforms.

Figure 18:
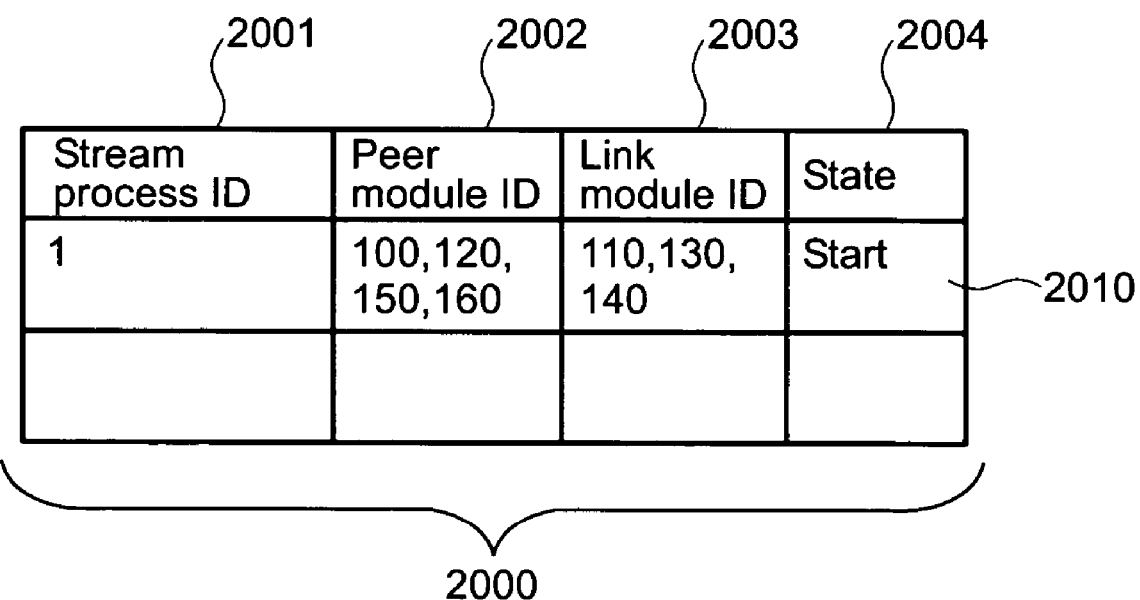
FIG. 18 is a table which shows the configuration of a streaming process.

Now, let us consider that the software modules in FIG. 2 are transported to a different platform. As mentioned above, the software modules included in the layer (250) require changes in the process methods with respect to platform-dependent functions or procedure-dependent portions. However, it is possible to transport the higher layers, such as the control interface (220), the data processing module manager (240), the stream manager (230), and the application (200), to the other OS's without changing the program processes. Referring now to FIGS. 16, 17, and 18, the following description is provided to indicate how the configuration in FIG. 2 implements the process described with reference to FIG. 1.

FIG. 18 shows a table (2000) that records the configuration of streaming processes. The stream manager manages this table. One row of the table corresponds to one streaming process. Each streaming process comprises a streaming process ID (2001), a peer module ID (2002) of a peer module constituting the streaming process, a link module ID (2003) of a link module constituting the streaming process, and a streaming process state (2004).

FIG. 16 shows a table (1800) that records the configuration of peer modules. The peer module manager manages this table. One row of the table corresponds to one peer module. Each peer module comprises a peer module ID (1801), a streaming process ID (1802), a data processing module ID (1803), a data access module ID (1804), an input link module ID (1805), an output link module ID (1806), an execution waiting data object matrix (1807), and a postprocessing waiting data object matrix (1808). The execution waiting data object matrix (1807) and the postprocessing waiting data object matrix (1808) are capable of data input/output. These matrices are implemented by arrays, queues, hash tables, lists, and the like. FIG. 16 shows an example in which it is indicated whether or not the table contains matrices. When the peer module manager contains matrices, it may be preferable to record addresses corresponding to the matrices using the columns (1807) and (1808). Value −1 for the link module ID indicates that no link module is connected to the peer module (100).

FIG. 17 shows a table (1900) that records the configuration of link modules. The link module manager manages this table. One line of the table corresponds to one link module. Each link module comprises a link module ID (1901), a streaming process ID (1902), a start point peer module ID (1903), an end point peer module ID (1904), and a buffer matrix (1905). The buffer matrix (1905) is capable of data input/output. This matrix is implemented by an array, queue, hash table, list, and the like. FIG. 17 shows an example in which it is indicated whether or not the table contains matrices. When the link module manager contains matrices, it may be preferable to record addresses corresponding to the matrices using the column (1905).

Figure 3:
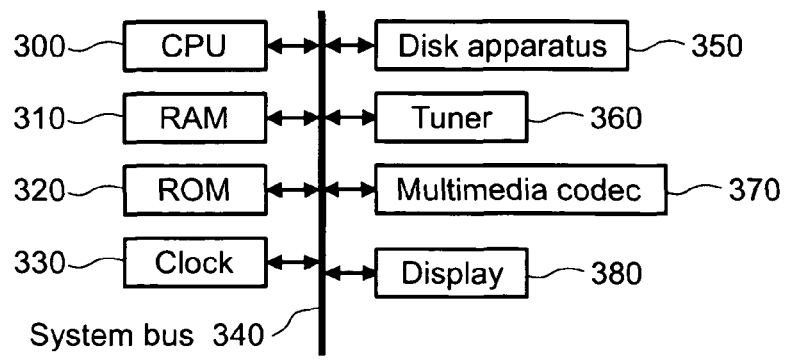
FIG. 3 is a schematic block diagram showing a hardware configuration.

FIG. 3 shows a hardware configuration used for this embodiment. A system bus (340) is connected with a CPU (300); memories, such as a RAM (310) and a ROM (320); a clock (330); a disk apparatus (350), such as a HDD, a tuner (360) to receive the content data broadcast; a multimedia codec processor (370) to encode or decode multimedia data; and a display (380), such as a television set with built-in speakers. The software module in FIG. 2 is loaded into the memory and is performed by the CPU. This hardware configuration may be used for HDD recorders, DVD recorders, PCs, monitoring cameras, and the like.

FIG. 5 exemplifies instructions to be issued to the control interface so that an application according to this embodiment can control the stream manger (230). FIG. 5 defines an instruction type (501), a parameter (502), and a return value (503) to be issued to the stream manager (230). When the embodiment is developed in programming languages such as C and C++, for example, the control interfaces are implemented as functions or modules.

It is possible to create a data processing flow using the data access module ID, the data processing module ID, and instructions defined in FIG. 5, and to start the process. A more detailed description will be given with reference to FIG. 7.

With reference to FIG. 5, the following description is directed to instructions that create and control a process flow of data. For example, processing a streaming process generation instruction (500) generates a streaming process. Specifically, a unique streaming process ID is allocated. The streaming process ID is recorded on an unused row in the table (2000) of FIG. 18 to generate a streaming process. As a result, the return value is generated. In this example, it is assumed that that value 1 is returned to the application.

The application then uses this streaming process ID to perform a peer module generation instruction (520) and generate a peer module. Specifically, a new unique streaming process ID is allocated. The peer module ID is recorded on an unused row in the table (1800) of FIG. 16. The table records the streaming process ID passed as a parameter. The table (2000) records the peer module ID in the column for the peer module ID (2002) of the streaming process corresponding to the streaming process ID specified as a parameter to generate a peer module. The allocated peer module ID is returned as a return value to the application. In this example, it is assumed that value 100 is returned.

Likewise, the next example generates another peer module (120) indicated by the reference numeral 1820 in FIG. 16. The peer module is assumed to be assigned module ID 120. A link module generation instruction (540) is used to connect these peer modules with a link module. Specifically, a unique link module ID is allocated. The streaming process ID is recorded on an unused row in the table (1900) of FIG. 17. A start point peer module ID and an end point peer module ID are passed as parameters and are recorded. In the example, values 100 and 120 are recorded as the start point peer module ID and the end point peer module ID, respectively. In the table (1800), value 110 is recorded for the output link module ID on the row (1810) containing the peer module ID set to 100. Value 110 is recorded for the input link module ID on the row (1820) containing the peer module ID set to 120. In the table (2000), the link module ID is registered for the link module ID (2003) on the row (2010) containing the streaming process ID set to 1. These processes complete generation and configuration of the link module that connects between peer modules.

The following description will indicate how to specify which process the peer module should perform using a data processing module control instruction (560) and a data access module control instruction (570). A detailed description will be provided about the data processing module ID as a parameter in the data processing module control instruction (560) with reference to FIG. 14. A detailed description will be provided concerning the data access module ID as a parameter in the data access module control instruction, with reference to FIG. 13. For example, the data access module control instruction (570) is used to allocate a process with, the data access module ID set to 1, to the peer module with the peer module ID set to 100. In this manner, the table (1800) records the data access module ID set to 1 for the data access module ID (1804) on the row containing the peer module ID set to 100. Likewise, the data processing module control instruction (560) is used to configure the data processing module. The data processing module and the data access module will be described later in more detail with reference to FIG. 4.

Let us consider a case of using a data processing control command instruction represented by the reference numeral 580. In this case, a "command" parameter can be used to control or configure the data processing module. When the data processing module performs network processing, for example, a "packet size setting command" can be used to change packet sizes in the data processing module. The data access module control instruction (570) can be used to specify a file name for reading data from the file or to specify a port number for inputting data to or outputting data from the network.

A data processing command instruction (580) issues a start command or a stop command. This instruction is used to control execution of data processing. It is possible to control scheduling of peer modules associated with streaming processes. This is because the table (2000) registers link modules and peer modules associated with the streaming processes. Specifying a streaming process ID can change settings and operations of all the associated link modules and peer modules.

The application can communicate with a data processing module (401) via an event management instruction (590). The application can pass events, such as errors, or terminate data processes. A streaming process discard instruction (510) can be used to discard or terminate data processes. A peer module discard instruction (530) or a link module discard instruction (550) can be used to selectively discard data processes. In this case, discarding a process is equivalent to deleting the registered table content.

FIG. 13 shows a table (1300) that manages the correspondence between a data access module ID and an associated data access module. This table is contained in the data access module manager (270). The table (1300) records a data access module ID (1301), an address (1302) pointing to the corresponding input/output execution section, an address (1303) pointing to the corresponding input/output completion section, and function descriptions (1304 and 1305). According to the example in FIG. 13, the data access module ID that is set to 1 (1310) shows that the table records the input/output execution section at address 0xF9800000 having the function of "issuing a request to read data onto the hard disk" and the input/output completion section at address 0xF9808000 having the function of "obtaining data from the hard disk".

A manual or the like is provided to describe the correspondence between a data access module ID and a process actually performed by the module. Referring to the manual, for example, a user can find the data access module ID to implement the necessary function. Alternatively, the user can select a necessary function from the function description columns (1304 and 1305) according to the contents provided therein.

FIG. 14 shows a table that is used to manage the correspondence between a data processing module ID and an associated data processing module. This table is contained in the data processing module manager (240). The table (1500) records a data processing module ID (1501), an address (1502) pointing to the corresponding preprocessing section, an address (1503) pointing to the corresponding postprocessing section, and function descriptions. According to the example shown in FIG. 14, for the data processing module ID set to 100 (1510), the table records the preprocessing section at address 0xFA800000 having the function of "instructing to read a specified file and specifying the next scheduling time" and the postprocessing section at address 0xFA808000 having the function of "outputting obtained data to the output link". A manual or the like describes is the correspondence between a data processing module ID and a process actually performed by the module. Referring to the manual, for example, a user can find the data processing module ID to implement the necessary function. Alternatively, the user can select a necessary function from the function description columns (1504 and 1505) according to the contents provided therein.

FIG. 15 shows a procedure for the data process as shown in FIG. 1. According to this procedure, the application uses the instructions shown in FIG. 5 to connect a peer module with a link module and constitutes a data processing program.

The application first uses the streaming process generation instruction (500) to generate a data processing flow (step 1500) and obtains a streaming process ID.

The application then uses the streaming process ID and the peer module generation instruction (520) to generate a file read peer module and obtains a peer module ID. The application allocates a data processing module to the file read peer module (step 1511) using the data processing module ID for the data processing module control instruction (560). The application allocates a data access module using the data access module ID (step 1512) for the data access module control instruction (570). Likewise, the application creates a multiplexer peer module (step 1520) and allocates a data process module to it (step 1521). In a similar manner, the application creates a video peer module (step 1530). The application then allocates a data processing module and a data access module (steps 1531 and 1532). The application creates an audio peer module (step 1540) and allocates a data processing module and a data access module to it (steps 1541 and 1542). Using the link module generation instruction (540), the application creates a link module for connecting the multiplexer peer module from the file read peer module (step 1550) to obtain the link module ID. Likewise, the application creates a link module for connecting the video peer module and a link module for connecting the audio peer module from the multiplexer peer module (steps 1560 and 1570). In this manner, the application performs processing of associating the peer modules to be used with each other and allocating the data processing modules and the data access modules used for the process.

As mentioned above, the application uses the control instructions to generate and configure peer modules, link modules, and the like. Necessary peer modules are generated based on instructions performed from the application. A link module is used to connect these peer modules with each other to create a data processing flow. The peer modules are assigned with information, such as bit rates, data access modules, and data processing modules, that is needed for the process. An instruction to start the data process enables the specified process to be performed.

Provision of this function greatly reduces the descriptions of the application that performs the streaming process. This is because the streaming process is a highly real-time process and it is important for the streaming process to process data at a specified bit rate. The development of a program to implement such a process requires a most advanced scheduling technique that uses platform-provided functions such as time management and dedicates the CPU time to part of the process for an uninterrupted processing flow. On the other hand, the technique according to the embodiment submits the scheduling to the stream manager. An application using the stream manager just needs to generate a peer module, associate it with a link module, create necessary data access modules and data processing modules, and associate them with the peer module. The application does not need to implement the above-mentioned scheduling function.

The modules just need to use platform-independent interfaces provided by the stream manager. The application can be used for any platforms without changes.

Figure 4:
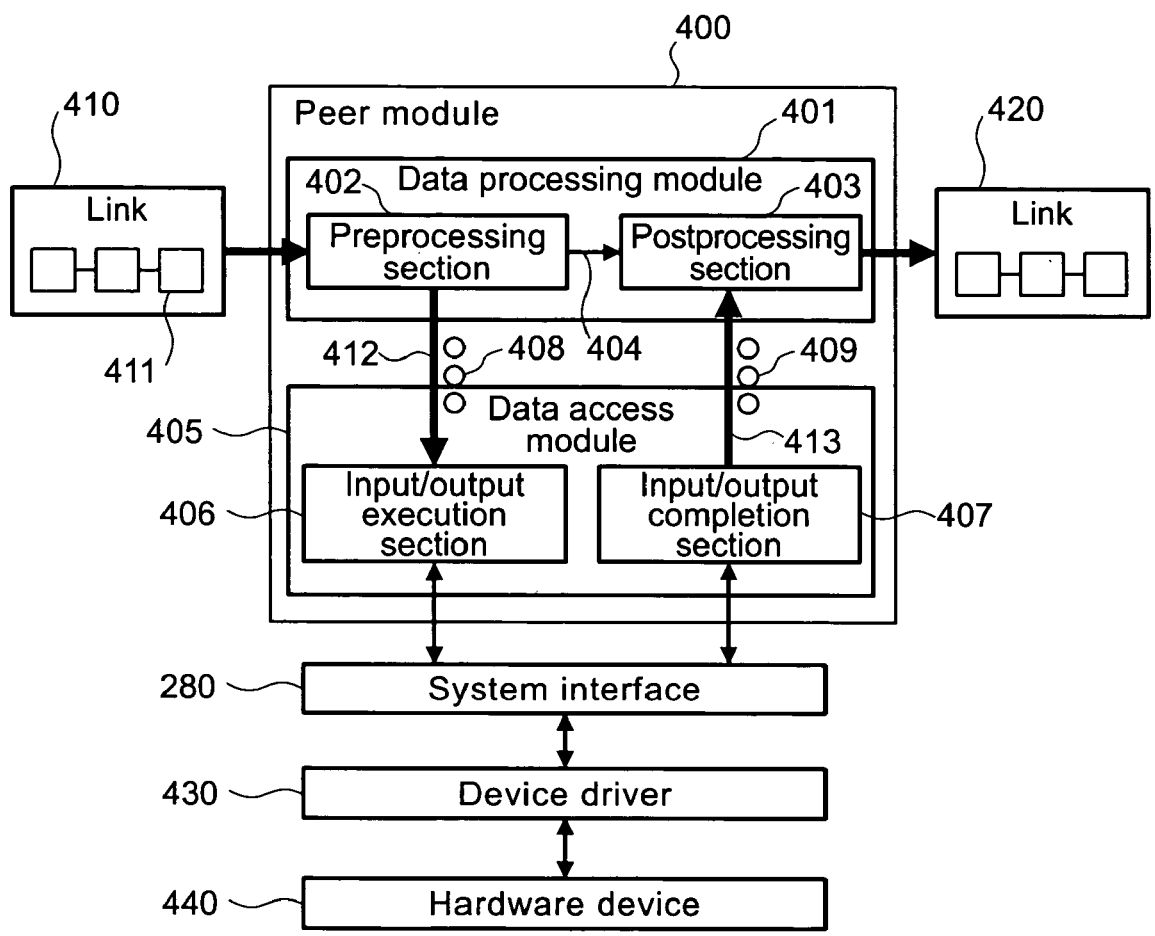
FIG. 4 is a schematic block diagram showing definitions of process points according to the embodiment.

FIG. 4 shows a logical configuration of the peer module that has been described with reference to FIG. 16. A peer module (400) comprises a data processing module (401) and a data access module (405). The data processing module (401) performs data processing that is dependent on data formats. The data access module (405) uses a specific hardware apparatus to perform data processing via the OS's system interface (280). The peer module is identified by an identifier (peer module ID) unique to that peer module in the stream manager.

The data processing module (401) is identified by a unique identifier (data processing module ID), and it further comprises a preprocessing section (402) and a postprocessing section (403). A column (1803) in the table (1800) records the correspondence between a peer module and a data processing module. The data access module (405) is also identified by a unique identifier (data access module ID), and it further comprises an input/output execution section (406) and an input/output completion section (407). A column (1804) in the table (1800) records the correspondence between a peer module and a data access module.

The peer module is linked to another peer module by means of link modules (410 and 420). The link module has a buffer matrix (411). When the link module (410) is connected to an input side of the data processing module, data buffered in the link module can be output to the preprocessing section of the data processing module. When the output link module (420) is connected to an output side of the data processing module, data buffered in the link module can be input from the postprocessing section of the data processing module.

When another peer module processes data, for example, this data is written to the buffer and is supplied to the input link module (410). The preprocessing section (402) receives the data and converts it into a data object (408) that is then placed in an execution waiting data object matrix (412). The data access module (405) obtains and processes the data object. The data object (408) will be described in more detail with reference to FIG. 12.

The data access module accesses a device driver (430) via the system interface (280) in the OS to input or output data from a hardware device (440). An input/output execution section (406) of the data access module requests data input/output or processes data passed from the preprocessing section. When processing data, for example, the input/output execution section (406) issues an instruction to read files stored in the hardware device (440). As another example, the input/output execution section (406) performs a data conversion process, such as instructing the hardware for encryption to encrypt data in the data object (408). The input/output completion section (407) obtains a process result and places it as a data object (409) in a postprocessing waiting object matrix (413). The postprocessing section extracts the data object from the postprocessing waiting object matrix (413), and then it outputs data in the extracted data object to an output link module (402) to terminate the data processing of the peer module.

The peer module scheduler (233) performs these operations by referring to the tables (1800 and 1900). The peer module scheduler (233) controls the timings for performing the operations in accordance with information contained in the scheduling table (1100) shown in FIG. 11. The details of FIG. 11 will be described later.

The peer module is linked to one or more input link modules and one or more output link modules. When two or more peer modules are linked via a link module, a series of data processing flows can be realized. Data from a plurality of peer modules can be collected into a single peer module for multiplexing a plurality of pieces of data. Further, a single data flow can be transmitted to different peer modules. It is possible to separate multiplexed data as shown in FIG. 1 or multiplex a plurality of pieces of data, for example.

Using different hardware devices for the platform may change the system of implementing the input/output execution section (406) and the input/output completion section (407) for the data access module. Modifying the data access module enables the execution of processes by modules on layers higher than the layer for that data access module independently of the system interface.

Figures 11, 12:
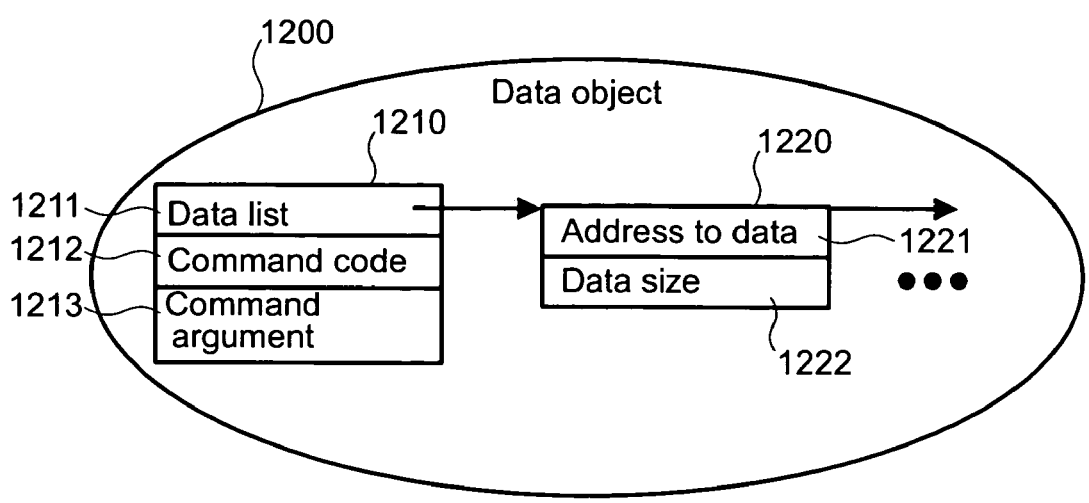
FIG. 11 shows a table for managing schedule times.
FIG. 12 shows the configuration of a data object.

FIG. 12 shows the configuration of a data object. A data object (1200) comprises a data list (1210), a command code (1212), and a command argument (1213). The data list further stores an address (1221) pointing to data and a data size (1222). The data object uses the data list (1210) to maintain data to be processed. The data object further records a command (1211) and a parameter (1213) corresponding to the data. The data object does not always need to record the command and the data in pairs. The data object may store only a command with no data. By contrast, the data object may store only data.

FIG. 11 shows the configuration of a schedule table in the peer module scheduler. A schedule table (1100) manages which peer module scheduler should perform which peer module at which time. The table contains a schedule time (1101) and a peer module ID (1102) as table columns. The schedule time in the table (1100) signifies a scheduled time to next perform processing of the data access module and the data processing module associated with a given peer module. When there is a need to perform a plurality of processes, to schedule is to determine and record which processes should be performed in which order at which time. The schedule execution or scheduling signifies execution of a process according to a predetermined schedule.

According to the example in FIG. 11, rows (1110) and (1120) show that peer modules with peer module IDs (10 and 13) are performed at a time of 250 milliseconds. That is to say, there may be a plurality of peer modules to be performed at the same time. If the same schedule time is specified, however, an actual process may be immediately followed by another process.

According to this embodiment, the peer module scheduler performs processes according to the contents recorded in the schedule table. That is to say, the peer module scheduler sequentially performs necessary processes by referencing the tables (1800), (1900), and (2000) at the above-mentioned timings. The peer module scheduler performs processes of the data processing module and the data access module for each peer module. In other words, one execution context, such as a thread, is used to perform processes of the peer module scheduler, the preprocessing section, the postprocessing section, the input/output execution section, and the input/output completion section.

For example, the peer module scheduler is activated periodically and references the table. If there is a peer module that has been assigned a schedule time earlier than the current time, the peer module scheduler performs a process for that peer module. The peer module scheduler updates the table (1100) if necessary, and then awaits the next activation.

Figure 6:
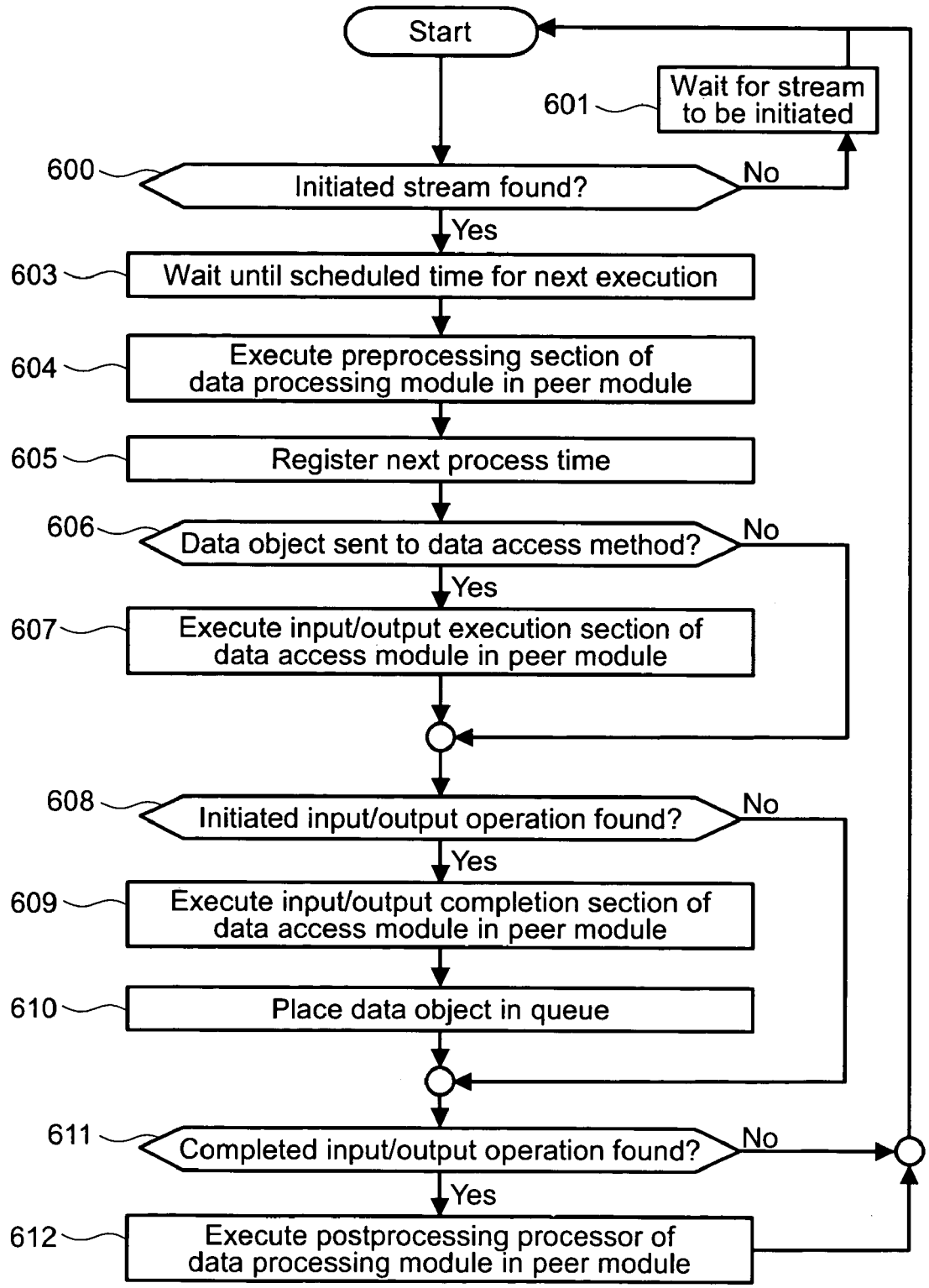
FIG. 6 is a flowchart showing process steps of the scheduling function for process points according to the embodiment.

An example of the execution procedure of a peer module will be described with reference to FIG. 6.

The peer module scheduler references a column (2004) of a stream table (2000) to check whether or not a streaming process (step 600) has already been initiated. If no streaming process has been initiated, the peer module scheduler waits until a new streaming process is performed (step 610). If there is an initiated streaming process, the peer module scheduler references the schedule table (1110) and waits until the next schedule time that is expected to occur first from the current time (step 603). Possible methods of waiting until the scheduled time are to periodically check the clock, to use a function of stopping the process execution for a specified time, or to use a time interrupt if the platform provides it. Immediately after the streaming process is initiated, the peer module does not yet reserve the process start time in the schedule manager. The stream manager registers the current time as the schedule time for the peer module constituting the streaming process so that the first process can be performed. When the wait process is complete, the peer module scheduler performs the preprocessing section in the data processing module for the peer module corresponding to the peer module ID (1102) in the schedule table (1100) (step 604). During the execution process, the preprocessing section checks to determine whether or not the input link module contains data. If the input link module contains data, the preprocessing section converts the data into a data object and inputs it to the execution waiting data object matrix (412). As shown in FIG. 1, a peer module may read data from the hard disk and works as a start point of the streaming process. For such a peer module, the preprocessing section inputs a data read request as a data object to the matrix.

The current module calculates the time to be scheduled next and registers that time to the peer module scheduler (step 605). The preprocessing section (402) determines the next schedule time because this section can calculate the time needed for the process in terms of sizes and the like of data (411) obtained from a link module (410). For example, the peer module (100) in FIG. 1 reads files at a bit rate of 1024 kilobytes per second and reads a block sized to be 256 kilobytes at a time. The application provides this specification using the data processing command instruction (580). In this case, a time interval for the peer module to read files can be determined by dividing [size of a data block to be read at a time] by [bit rate]. When the bit rate is 1024 kilobytes per second and the block size is 256 kilobytes, it will be understood that a read interval of 0.25 seconds can realize the specified bit rate. That is to say, after the preprocessing section requests 256-kilobyte data from the input/output process section, the next process is destined to occur 0.25 seconds later. The next scheduling time is determined to be 250 milliseconds later.

The peer module (100) is downstream followed by the demultiplexer peer module and the video peer module in FIG. 1. The scheduling time for these downstream peer modules may be determined from bit rates found in a similar method and from data sizes obtained via link modules. It is a good practice to set a relatively short scheduling time and to frequently perform the processes. The reason for this is as follows. The most upstream peer to read files controls the data bit rate in the above-mentioned method. When data is supplied to an input link object, a lower-order peer module promptly retrieves and processes the input data without especially controlling the bit rate, and then outputs it to the output link module. Consequently, the specified bit rate can be realized. In this case, it is preferable for the downstream peer objects to frequently confirm whether or not data is input to the link object so as to prevent the bit rate from being degraded due to a possible process delay. To do this, a small value should be reserved for the scheduling time.

Let us assume that the preprocessing section outputs the data object to the data access module (step 606). In this case, the peer module scheduler performs the input/output execution section of the data access module to start the process specified for that data object (step 607). For example, this step is equivalent to requesting the hardware device to process or obtain data.

There is a case where the execution waiting data object matrix has no data access module and the data access module does not output a new data object to the postprocessing waiting data processing matrix. In this case, the peer module scheduler proceeds to step 611 (step 608).

There is a case where the previously performed process for the input/output execution section has terminated and there is data as a process result. For example, this is equivalent to a case where the hardware device was requested to process or obtain data, the requested process has terminated, and resultant data is available. In such a case, the peer module scheduler performs the input/output completion section of the data access module (step 609). The peer module scheduler then inputs the data as a data object to a postprocessing waiting data object matrix (413) (step 610). When the postprocessing waiting data object matrix (413) contains a data object, the peer module scheduler performs the postprocessing section and passes only the data list in the data object to the output link module. When the process in the postprocessing section is complete, the peer module scheduler returns to the initial state to schedule the next peer module.

Let us consider a case of performing a plurality of streaming processes according to the present execution system. A single execution context of the peer module scheduler can perform processes of peer modules in the respective streaming processes. In this case, the execution context is an execution unit having information needed to perform a program and is equivalent to a thread, for example. Even if there is more than one streaming process, the use of the above-mentioned method allows each peer module to schedule the time to process the corresponding peer module. The peer module scheduler just needs to perform the peer module at the scheduled time. The use of one execution context for processing eliminates the need for a synchronization process that is needed for a plurality of streaming processes when performed by a plurality of execution contexts. A high load is applied to the synchronization process for exclusive access to the devices. Eliminating this process can prevent the streaming process performance from degrading.

For example, the system can raise the execution priority by shortening the reserved time for the peer module to be determined by the peer module's preprocessing section. This schedules the process for the peer module as early as possible, making it possible to use as much CPU time as possible for the peer module's process. Adjusting the above-mentioned reserved time makes it possible to specify the priority of each of the processes if any. Let us consider a case of simultaneously performing two processes. One process obtains data from a device and records it on a storage. The other process obtains data from a device and displays it on a display. If a short time is reserved for the former process, a higher priority can be assigned to the record process.

The use of one execution context to perform a plurality of data processes eliminates the need to allocate a plurality of buffers to a plurality of execution contexts. Further, it becomes unnecessary to use a semaphore for parallel execution of a plurality of contexts. The semaphore is a synchronization function to ensure exclusive access when a plurality of execution contexts share a single resource. Consequently, it is possible to reduce the number of resources to be used.

When one context performs processing, the peer module scheduler (233) is capable of efficient scheduling. A conventional scheduling system, such as the round robin system unconditionally switches between processes at a specified time interval. The conventional system may schedule a process though unneeded, or it may not schedule a process though needed. This degrades real time characteristics and unnecessarily consumes the CPU time. On the other hand, the system according to the present invention calculates the time needed for the next process and registers the necessary time on the scheduling table for the scheduling, eliminating unnecessary scheduling. While the conventional round robin system and the like allocate the CPU process to redundant times, the system according to the present invention can allocate the CPU process to other processes. As a whole, this improves the utilization ratio of the CPU time as one of the platform resources. Further, the process is correctly scheduled at the time when the process is needed. Thus, it is possible to improve the real time characteristics.

Figure 7:
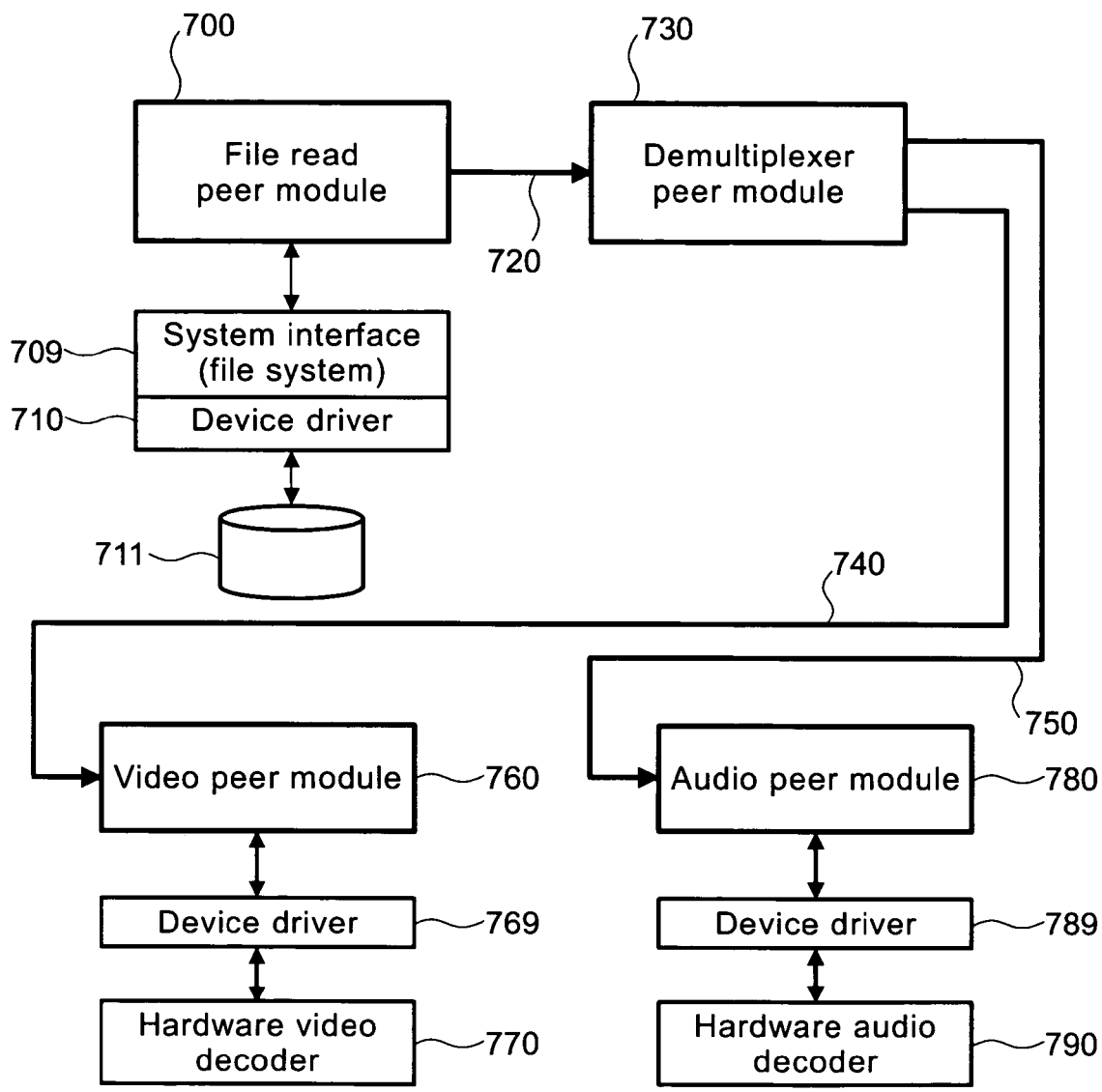
FIG. 7 is a simplified schematic block diagram exemplifying a data processing flow for providing a video filter that is stored in a-storage and is decoded through the use of a hardware decoder.

FIG. 7 shows an example of the data flow of the data process using a peer module, the link module, and a peer module scheduler according to this embodiment. In this example, the process reads a file from the hard disk. The file records audio and video data in a multiplexed manner. The process separates the multiplexed data to reproduce it as a moving image on a display and from a speaker. The MPEG (Motion Picture Expert Group) system is an example of multiplexing audio and video data for recording. In the process, a file read peer module (700) is linked to a demultiplexer peer module (730) with a link module (720). The demultiplexer peer module (730) is linked to a video peer module (760) with a link module (740). The demultiplexer peer module (730) is further linked to an audio peer module (780) with a link module (750).

The file read peer module accesses the hard disk via a system interface (709) and a device driver (710) to obtain data. The demultiplexer peer module (730) demultiplexes the obtained data. Video data obtained through this process is sent to the video peer module (760) and then is sent to a hardware video decoder (770) via a device driver (769). Audio data is sent to the audio peer module (780) and then is sent to a hardware audio decoder (790) via a device driver (789) for reproduction.

Figure 10:
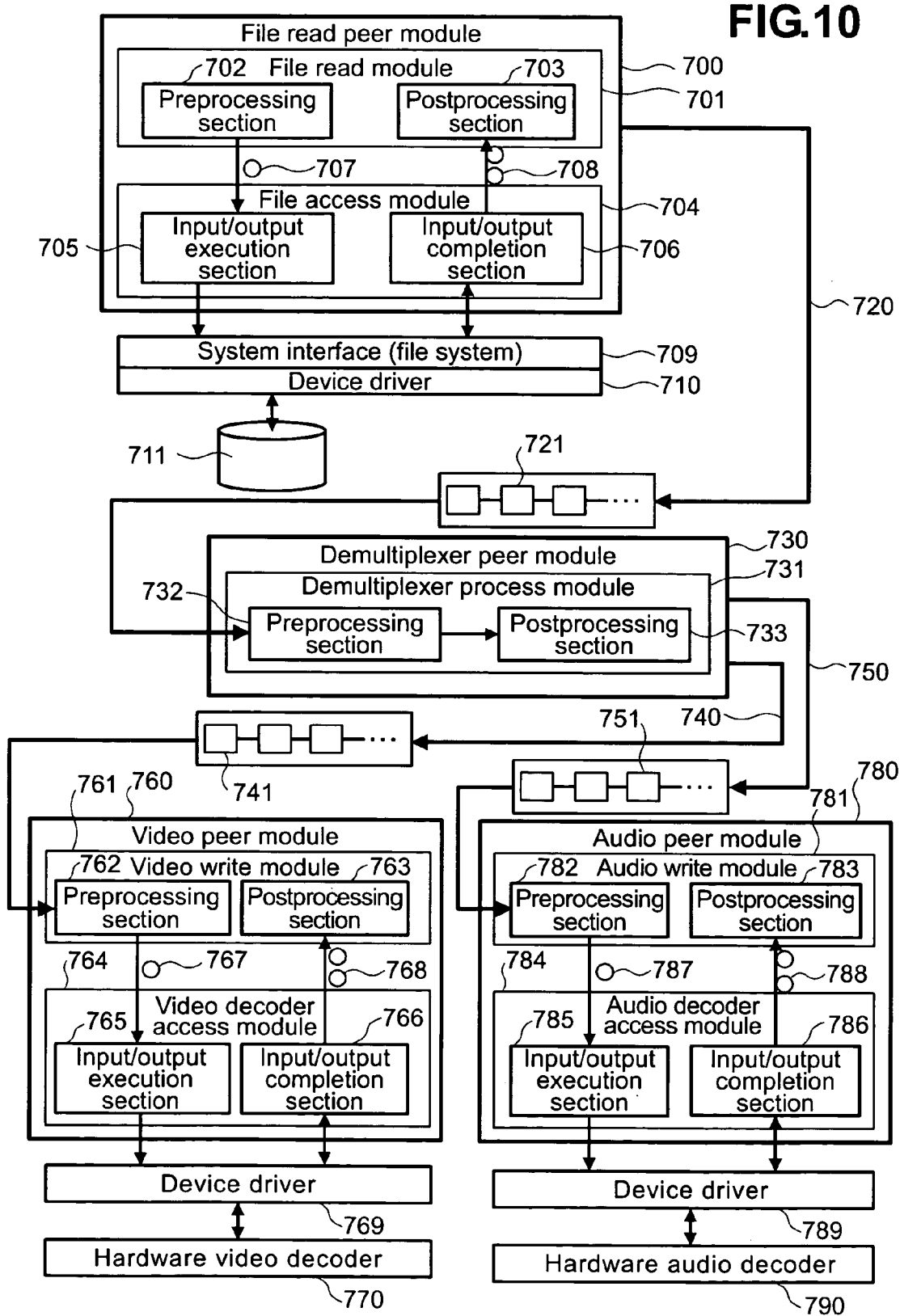
FIG. 10 is a schematic block diagram exemplifying a data processing flow for providing a video filter that is stored in a storage and is decoded through the use of a hardware decoder.

FIG. 10 shows a detailed configuration of the process shown in FIG. 7. The process procedure will be described with reference to FIG. 10.

The peer module scheduler starts execution of the data processing module for the file read peer module. A preprocessing section (702) of a data processing module (701) issues a request to place a data object (707) in an input/output waiting data object matrix so that the data object is passed to an input/output execution section (705) of a data access module (704). The data processing module (701) corresponds to the file read module. The data access module (704) corresponds to the file access module. The data object (707) corresponds to the file read input/output process. An input/output process section (705) processes the read process via the system interface (709) and the adaptor device driver (710) for the storage. When another read process has been performed before execution of the current process, the peer module scheduler checks to determine whether or not the previous process has been completed. If the previous process is complete, an input/output completion section (706) is performed. The data is placed as a data object (708) in a postprocessing waiting data object queue.

A postprocessing section (703) is performed to obtain the data object (708) placed in the postprocessing waiting data object matrix. The data list in the data object is queued to a buffer of the link module (720).

Each of these processes is retrieved as follows. The file read peer module has peer ID 100. Based on this value, the peer module scheduler references the table (1800) and obtains a data processing module ID allocated to the data processing module. The example of FIG. 16 shows that the data processing module ID is 100. The peer module scheduler then references the table (1500) and retrieves the row corresponding to data processing module ID 100. The retrieval result shows that the preprocessing section to be performed is found at address 0xFA800000 and the postprocessing section to be performed is found at address 0xFA808000. The peer module scheduler performs these processes. In this case, these address locations store the contents of the processes as follows. The process of the preprocessing section is used to instruct reading of a specified file and then specify the next scheduling time. The process of the postprocessing section is used to output the obtained data to the output link. Likewise, the peer module scheduler references the table (1800) in terms of the data access module to obtain a data access module ID allocated to the data access module. The example in FIG. 16 shows that the data access module ID is 1. The peer module scheduler then references the table (1300) and retrieves the row corresponding to data access module ID 1. In this manner, the peer module scheduler obtains the addresses for the input/output execution section and the input/output completion section to be performed, and then performs them. In this case, these address locations store the contents of the sections as follows. The process of the input/output execution section is used to issue a request to read data to the hard disk. The process of the input/output completion section is used to obtain data from the hard disk.

The peer module scheduler performs a demultiplexer processing module (731) of the demultiplexer peer module (730). A preprocessing section (732) is then performed to extract a data list from a queue (721) of the link module (720). If the queue has no data, the preprocessing section terminates the process. Control is then passed to the process of the postprocessing section.

The above-mentioned process in the preprocessing section is the same as that for the second or later linked peer module from the start point in the data processing flow. The preprocessing sections for all the peer modules reserve times to perform themselves before terminating the processes. The reserved time depends on the bit rate of the corresponding streaming process or the required real time characteristics. When the process handles data at a high bit rate or is requested to provide advanced real time characteristics, the process must fast handle data and pass it to the next peer module. In this case, the process needs to frequently check to determine whether or not data is stored in the buffer of the input link module. On the other hand, when the bit rate is low, the check can be performed at a relatively long interval.

The process of the demultiplexer peer module corresponds to conversion of the data format. This process can be performed by a program. There is no need for access to I/O hardware, such as hard disks. The data access module does not need to define the process. After data is processed in the preprocessing section, the data is passed to a postprocessing section (733). In this case, the process of converting the data format is summarized as follows. The preprocessing section (732) of the multiplexer peer module analyzes the supplied data in advance and writes the result to two buffers, i.e., an audio buffer and a video buffer. The postprocessing section extracts the video data from the video buffer and inputs it to a queue (741) of the link module (740). Likewise, the postprocessing section extracts the audio data from the audio buffer and inputs it to a queue (751) of the link module (750).

A video write module (761) is the data processing module of the video peer module (760). When a preprocessing section (762) of the video write module (761) is performed, a data list placed in the queue (741) is extracted. Data is sent to a video decoder access module (764) in accordance with the bit rate determined by the application using a processing module control instruction (560). An input/output execution section (765) outputs the data to the device driver (769) for the hardware video decoder (770). The data is then output to the hardware video decoder (770). As a result, video is output. An input/output completion section (766) of the video decoder access module detects data whose output is complete. The video decoder access module is a data access module. That data is then placed as a data object (768) in a termination process waiting data object matrix. The video peer module is positioned at the end of the data processing and has no output link module. A postprocessing section (763) discards the video data that is written to the device.

The process in the voice peer module (780) is similar to that for the video peer module. A preprocessing section (782) is performed in an audio write module (781) as a data processing module for the audio peer module to extract an audio data list that has been placed in the queue (751). The data list is sent to an audio decoder access module (784) as a data access module in accordance with the bit rate of the extracted data. An input/output execution section (785) initiates the process. The audio data is sent to the hardware audio decoder (790) through the device driver (789) for reproduction. An input/output completion section (786) of the data access module detects data whose output is complete. The completed data is then placed as a data object (768) in a postprocessing waiting data object matrix. A postprocessing section (783) discards the data thereafter.

Figure 8:
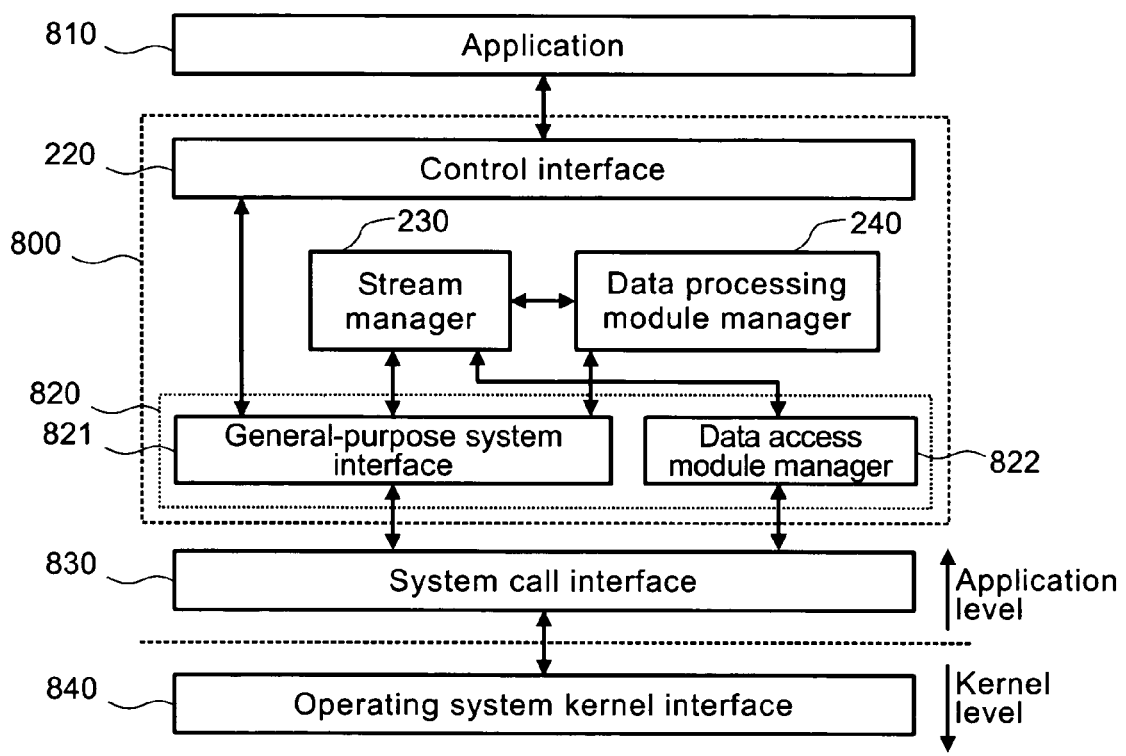
FIG. 8 is a schematic block diagram showing an implementation example of the embodiment for execution at an application level of the operating system.

FIG. 8 shows an example of implementing the configuration of FIG. 2 in a user space. Implementation in the user space provides an effect of making the development easy because all modules are implemented in the user space. The reason for this is as follows. It is possible to use development tools such as a debugger and the like, that are used for developing application programs. Further, the OS-provided memory management function can be used. This can prevent interferences from the other applications and improve the reliability and the availability.

Figure 9:
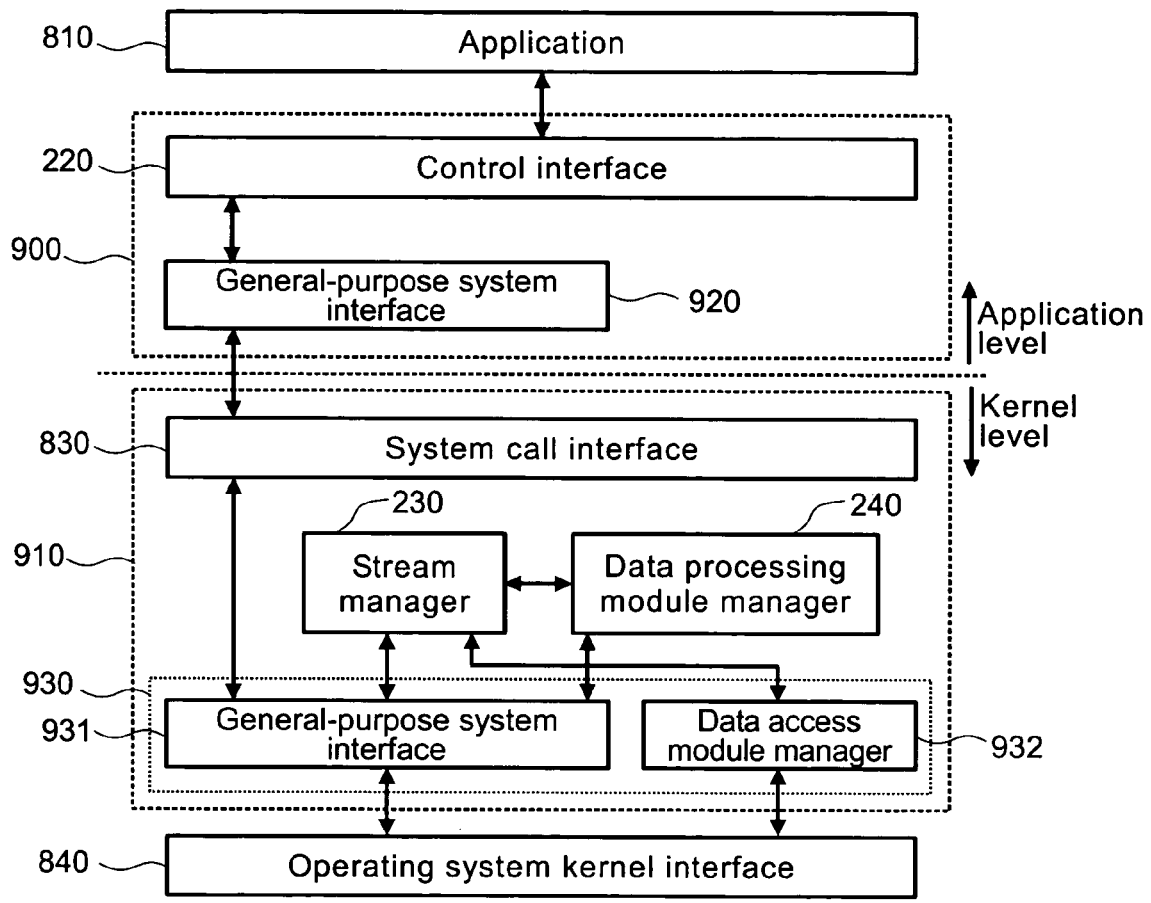
FIG. 9 is a schematic block diagram exemplifying an implementation example of the embodiment for execution at a kernel level of the operating system.

FIG. 9 shows an example of using the OS for a major part of the configuration in FIG. 2. For example, the implementation in the kernel space more greatly excels in performance than that in the user space if the OS gives a higher priority to execution of modules in the OS than to that of application programs. This is especially efficient when real time characteristics are required for the content processing at a high bit rate.

In these two configurations, the general-purpose system interfaces (920 and 931) and the data access module manager (932) depend on the platform. The other program modules belonging to the embodiment are independent of the platform. The reason for this is as follows. The modules resolve hardware or OS dependent procedures to use OS functions or different device access methods. The platform-provided functions can be used by using generalized interfaces supplied from the modules.

Which configuration should be used must be determined in consideration of the usage, the hardware configuration, and the number of development steps. For example, the implementation in the kernel space of FIG. 9 may be adopted when the platform uses a low CPU performance or when a high throughput is requested. This configuration relatively easily provides high throughput though the debugging or the like becomes slightly difficult. By contrast, the implementation in the user space of FIG. 8 may be adopted when the CPU is sufficiently fast and enough execution resources are available, such as memory, or when high throughput is not requested. This configuration features easy implementation.

The technology according to the present invention can be used for streaming processes, such as moving image and audio processes. The technology can be applied to broadcast equipment, receivers, video or audio recorders, monitoring cameras, and the like.

What is claimed is:

1. A data processing method for a data processing apparatus including a storage section to store process modules, an instruction issuing section to issue instructions, and a calculation processing section to perform processes using said process modules, said method comprising:

specifying at least one process needed to process said data based on a first instruction issued from said instruction issuing section;

generating a process module needed for said specified process in said storage section;

selecting a data access module needed for said specified process from a plurality of data access modules, stored in said storage section, for accessing a device driver for an input apparatus or output apparatus via a system interface and for inputting data from said input apparatus or outputting data to said output apparatus;

selecting a data processing module needed for said specified process from a plurality of data processing modules, stored in said storage section, for inputting data from said data access module or outputting data to said data access module and for performing a process for data;

allocating said selected data access module and said selected data processing module to said generated process module;

using a link module to connect said process modules with each other to generate a process flow to perform said process in said storage section;

inputting data supplied from said input apparatus to a start of said process flow based on a second instruction issued from said instruction issuing section and allowing said calculation processing section to perform said process flow; and allowing said output apparatus to output a process result of said process flow performed;

wherein said selected data access module and said selected data processing module of said generated process module, are configured to communicate with each other via data objects, each of said data objects is generated by said selected data processing module, from data received from an input link module connected to said selected data processing module, and includes at least one of data information for maintaining data to be processed, or a command code and a command argument corresponding to the data, wherein said selected data processing module includes a first processing section to perform conversion process from data input via said input link module to a data object to be output to said data access module; and a second processing section to extract data based on a data object received from said data access module and output said data to an output link module connected to said selected data processing module, wherein said first processing section calculates a timing to initiate said selected data processing module next time based on said second instruction issued from said instruction issuing section.

2. The data processing method according to claim 1, wherein said selected data processing module is adapted to format data and perform a first specified process for data, input via said link module, to obtain first processed data, and then output said first processed data to said data access module, and perform a second specified process for data, input from said data accessing module, to obtain second processed data, and then output said second processed data to another process module via said link module.

3. The data processing method according to claim 1, wherein said selected data access module comprises:
an input/output execution section to transmit an input/output request for data transmitted from said first processing section to said input or output apparatus via said device driver for said input apparatus or said output apparatus; and
an input/output completion section to output data obtained by said input/output request to said second processing section.

4. The data processing method according to claim 1, wherein said data processing management module references said table to perform a process registered to said table using a single execution context based on said registered timing.

5. The data processing method according to claim 4, wherein said first processing section calculates said timing based on a bit rate notified from said instruction issuing section and a block size as a unit of processes in said first processing section.

6. A data processing apparatus comprising:
a storage section configured to store process modules;
an instruction issuing section configured to issue instructions; and
a calculation processing section configured to perform processes using said process modules;
a process specifying section configured to specify at least one process needed to process said data based on a first instruction issued from said instruction issuing section;
a process module generator section configured to generate a process module needed for said specified process in said storage section;
a data access module selector configured to select a data access module needed for said specified process from a plurality of data access modules, stored in said storage section, to access a device driver for an input apparatus or an output apparatus via a system interface, and to input data from said input apparatus or output data to said output apparatus;
a data processing module selector section configured to select a data processing module needed for said specified process from a plurality of data processing modules, stored in said storage section, for inputting data from said data access module or outputting data to said data access module and for performing a process for data;
an allocation section configured to allocate said selected data access module and said selected data processing module to said generated process module;
a connection section configured to use a link module to connect said process modules with each other to generate a process flow to perform said process in said storage section;
an inputting section configured to input data supplied from said input apparatus to a start of said process flow based on a second instruction issued from said instruction issuing section and allow said calculation processing section to perform said process flow; and
an outputting section configured to allow said output apparatus to output a process result of said process flow performed;
wherein said selected data access module and said selected data processing module of said generated process module, are configured to communicate with each other via data objects, each of said data objects is generated by said selected data processing module, from data received from an input link module connected to said selected data processing module, and includes at least one of data information for maintaining data to be processed, or a command code and a command argument corresponding to the data,
wherein said selected data processing module includes
a first processing section to perform conversion process from data input via said input link module to a data object to be output to said data access module; and
a second processing section to extract data based on a data object received from said data access module and output said data to an output link module connected to said selected data processing module,
wherein said first processing section calculates a timing to initiate said selected data processing module next time based on said second instruction issued from said instruction issuing section.

7. The data processing apparatus according to claim 6, wherein said selected data processing module is configured to format data and perform a first specified process for data, input via said link module, to obtain first processed data and then output said first processed data to said selected data access module, and perform a second specified process for data, input from said data accessing module, to obtain second processed data and then output said second processed data to another process module via said link module.

8. The data processing apparatus according to claim 6, wherein said selected data access module comprises:
an input/output execution section to transmit an input/output request for data transmitted from said first processing section to said input apparatus or said output apparatus via said device driver for said input apparatus or said output apparatus; and
an input/output completion section to output data obtained by said input/output request to said second processing section.

9. The data processing apparatus according to claim 6, wherein said data processing management module references said table to perform a process registered to said table using a single execution context based on said registered timing.

10. The data processing apparatus according to claim 9, wherein said first processing section calculates said timing based on a bit rate notified from said instruction issuing section and a block size as a unit of processes in said first processing section.

11. A non-transitory computer-readable storage medium embodying a program for effecting a data processing method for a data processing apparatus which includes a storage section to store process modules, an instruction issuing section to issue instructions, and a calculation processing section to perform processes using said process modules, said program, upon implementation, effecting operations comprising:
specifying at least one process needed to process said data based on a first instruction issued from said instruction issuing section;
generating a process module needed for said specified process in said storage section;
selecting a data access module needed for said specified process from a plurality of data access modules, stored in said storage section, for accessing a device driver for an input apparatus or output apparatus via a system interface and for inputting data from said input apparatus or outputting data to said output apparatus;

selecting a data processing module needed for said specified process from a plurality of data processing modules, stored in said storage section, for inputting data from said data access module or outputting data to said data access module and for performing a process for data;

allocating said selected data access module and said selected data processing module to said generated process module;

using a link module to connect said process modules with each other to generate a process flow to perform said process in said storage section;

inputting data supplied from said input apparatus to a start of said process flow based on a second instruction issued from said instruction issuing section and allowing said calculation processing section to perform said process flow; and allowing said output apparatus to output a process result of said process flow performed;

wherein said selected data access module and said selected data processing module of said generated process module, are configured to communicate with each other via data objects, each of said data objects is generated by said selected data processing module, from data received from an input link module connected to said selected data processing module, and includes at least one of data information for maintaining data to be processed, or a command code and a command argument corresponding to the data, wherein said selected data processing module includes a first processing section to perform conversion process from data input via said input link module to a data object to be output to said data access module; and a second processing section to extract data based on a data object received from said data access module and output said data to an output link module connected to said selected data processing module, wherein said first processing section calculates a timing to initiate said selected data processing module next time based on said second instruction issued from said instruction issuing section.

12. The non-transitory computer-readable storage medium according to claim 11, wherein said selected data processing module is adapted to format data and perform a first specified process for data, input via said link module, to obtain first processed data, and then output said first processed data to said data access module, and perform a second specified process for data, input from said data accessing module, to obtain second processed data, and then output said second processed data to another process module via said link module.

13. The non-transitory computer-readable storage medium according to claim 11, wherein said selected data access module comprises:

an input/output execution section to transmit an input/output request for data transmitted from said first processing section to said input or output apparatus via said device driver for said input apparatus or said output apparatus; and an input/output completion section to output data obtained by said input/output request to said second processing section.

14. The non-transitory computer-readable storage medium according to claim 11, wherein said data processing management module references said table to perform a process registered to said table using a single execution context based on said registered timing.

15. The non-transitory computer-readable storage medium according to claim 14, wherein said first processing section calculates said timing based on a bit rate notified from said instruction issuing section and a block size as a unit of processes in said first processing section.

\* \* \* \* \*